United States Patent
Gusev et al.

(10) Patent No.: US 10,387,789 B2
(45) Date of Patent: Aug. 20, 2019

(54) METHOD OF AND SYSTEM FOR CONDUCTING A CONTROLLED EXPERIMENT USING PREDICTION OF FUTURE USER BEHAVIOR

(71) Applicant: YANDEX EUROPE AG, Lucerne (CH)

(72) Inventors: Gleb Gennadievich Gusev, Moscow (RU); Aleksey Valyerevich Drutsa, Moscow (RU); Pavel Viktorovich Serdyukov, Moscow (RU)

(73) Assignee: Yandex Europe AG, Lucerne (CH)

( * ) Notice: Subject to any disclaimer, the term of this patent is extended or adjusted under 35 U.S.C. 154(b) by 701 days.

(21) Appl. No.: 15/156,439

(22) Filed: May 17, 2016

(65) Prior Publication Data

US 2017/0103334 A1    Apr. 13, 2017

(30) Foreign Application Priority Data

Oct. 13, 2015 (RU) .............................. 2015143745

(51) Int. Cl.
*G06N 7/00* (2006.01)
*G06N 20/00* (2019.01)
(Continued)

(52) U.S. Cl.
CPC .......... *G06N 7/005* (2013.01); *G06F 16/951* (2019.01); *G06N 20/00* (2019.01); *G06Q 30/00* (2013.01); *G06Q 30/02* (2013.01)

(58) Field of Classification Search
CPC ........ G06N 7/005; G06N 20/00; G06N 5/022; G06N 5/025; G06N 5/04; G06N 99/005;
(Continued)

(56) References Cited

U.S. PATENT DOCUMENTS 8,412,665 B2    4/2013 Wang et al.
8,468,110 B1    6/2013 Podgorny et al.
(Continued)

FOREIGN PATENT DOCUMENTS

| RU | 2414745 C2 | 3/2011 |
| WO | 2014040175 A1 | 3/2014 |
| WO | 2014089108 A1 | 6/2014 |

OTHER PUBLICATIONS

Kohavi et al., "Controlled experiments on the web: survey and practical guide", Springer 2008. (Year: 2008).*

(Continued)

*Primary Examiner* — Dave Misir
(74) *Attorney, Agent, or Firm* — BCF LLP

(57) ABSTRACT

The methods and systems described herein relate to conducting a controlled experiment using prediction of future user behavior. The method, executable on at least one server, comprises: collecting behavior data on two sets of users over a first period, wherein: the first set of users is exposed to a control; the second set of users is exposed to a treatment variant; and the behavior data relates to a performance parameter of the controlled experiment; based on a prediction model applied to the behavior data, calculating predicted values of the performance parameter for each user of the first set and the second set of users over a second period of time; and determining if a difference exists between the predicted values of the performance parameter for each user of the first set of users and the predicted values of the performance parameter for each user of the second set of users.

16 Claims, 5 Drawing Sheets

(51) Int. Cl.
*G06F 16/951* (2019.01)
*G06Q 30/00* (2012.01)
*G06Q 30/02* (2012.01)

(58) Field of Classification Search
CPC .............. G06F 16/951; G06F 17/30864; G06F 16/24532; G06F 16/2462; G06Q 30/00; G06Q 30/02; G06Q 30/0244
USPC .......................................................... 706/46
See application file for complete search history.

(56) References Cited

U.S. PATENT DOCUMENTS

| | | | |
|---|---|---|---|
| 8,595,154 B2 | 11/2013 | Breckenridge et al. | |
| 8,655,819 B1 | 2/2014 | Burkard et al. | |
| 8,756,184 B2 | 6/2014 | Li et al. | |
| 2004/0117239 A1* | 6/2004 | Mittal | G06Q 30/02 705/7.32 |
| 2005/0159921 A1* | 7/2005 | Louviere | G06Q 30/02 702/181 |
| 2010/0100419 A1* | 4/2010 | Natoli | G06Q 30/02 705/7.31 |
| 2012/0072279 A1* | 3/2012 | Agarwal | G06Q 30/0244 705/14.43 |
| 2013/0103624 A1 | 4/2013 | Thieberger | |
| 2013/0218818 A1* | 8/2013 | Phillips | G06Q 30/02 706/12 |
| 2014/0129323 A1 | 5/2014 | Amirbekian et al. | |
| 2014/0324599 A1 | 10/2014 | Munoz Torres et al. | |
| 2015/0106078 A1 | 4/2015 | Chang | |
| 2015/0106157 A1 | 4/2015 | Chang et al. | |
| 2015/0112796 A1 | 4/2015 | Greenzeiger et al. | |

OTHER PUBLICATIONS

Song et al., Evaluating and Predicting User Engagement Change with Degraded Search Relevance, International World Wide Web Conference Committee (IW3C2), May 13-17, 2013, Rio de Janeiro, Brazil.

Radinsky et al., Modeling and Predicting Behavioral Dynamics on the Web, International World Wide Web Conference Committee (IW3C2), WWW 2012, Apr. 16-20, 2012, Lyon, France.

Attenberg et al., Modeling and Predicting User Behavior in Sponsored Search, KDD'09, Jun. 28-Jul. 1, 2009, Paris, France, 9 pages.

Drutsa et al., Future User Engagement Prediction and Its Application to Improve the Sensitivity of Online Experiments, pp. 256-266, May 2015.

Deng et al., Improving the Sensitivity of Online Controlled Experiments by Utilizing Pre-Experiment Data, WSDM'13, Feb. 4-8, 2013, Rome, Italy, 10 pages.

\* cited by examiner

| USERS FROM THE SECOND SET OF USERS | THE # OF SESSIONS WITH THE SECOND VERSION OF THE SERP OVER THE FIRST PERIOD OF TIME # OF SESSIONS |
|---|---|
| USER D | 4 |
| USER E | 3 |
| USER F | 4 |
| ... | ... |

206 ⤴ 202

| USERS FROM THE FIRST SET OF USERS | THE # OF SESSIONS WITH THE FIRST VERSION OF THE SERP OVER THE FIRST PERIOD OF TIME # OF SESSIONS |
|---|---|
| USER A | 2 |
| USER B | 1 |
| USER C | 3 |
| ... | ... |

| Users from the second set of users | The # of predicted sessions with the second version of the SERP over the second period of time<br># of sessions |
|---|---|
| USER D | 3 |
| USER E | 2 |
| USER F | 4 |
| ... | ... |

302

| Users from the first set of users | The # of predicted sessions with the first version of the SERP over the second period of time<br># of sessions |
|---|---|
| USER A | 1 |
| USER B | 1 |
| USER C | 2 |
| ... | ... |

METHOD OF AND SYSTEM FOR CONDUCTING A CONTROLLED EXPERIMENT USING PREDICTION OF FUTURE USER BEHAVIOR

CROSS-REFERENCE

The present application claims priority to Russian Patent Application No. 2015143745, filed Oct. 13, 2015, entitled "METHOD OF AND SYSTEM FOR CONDUCTING A CONTROLLED EXPERIMENT USING PREDICTION OF FUTURE USER BEHAVIOR", the entirety of which is incorporated herein by reference.

FIELD

The present technology relates to methods of and systems for conducting a controlled experiment using prediction of future user behavior.

BACKGROUND

In recent years, controlled experiments, also known as A/B testing, have become the state-of-the-art technique for improving online services based on data-driven decisions. Modern online companies such as Microsoft, Google, and Yandex use online controlled experiments ubiquitously to improve their services, including the presentation of search engine result pages (SERPs), by means of data-driven decisions based on the results obtained from such experiments. The largest web service companies have designed special experimental platforms that allow them to run A/B tests at a large scale.

A controlled experiment compares two variants of a service at a time by exposing the variants to two user groups and measuring the difference between them in terms of a key metric, typically a user engagement metric in the context of online services (e.g., the number of visits, the number of clicks, etc.). The ability of the metric to detect a statistically significant difference when the treatment effect exists is referred to as the sensitivity of the experiment. Online service companies are continuously striving to improve the sensitivity of their controlled experiments as greater sensitivity provides more meaningful results, which in turn allows companies to improve their services more efficiently and effectively.

The state-of-the-art approach to improving the sensitivity of controlled experiments is to increase the amount of the observed statistical data, which can be done either by increasing the population of users participating in the experiment or by extending the duration of the experiment. However, both of these approaches have significant disadvantages. First, the population of users is limited by web service traffic, and thus it may not always be feasible to increase the amount of users participating in an online controlled experiment. Second, increasing the length of a controlled experiment reduces the amount of experiments that can be conducted within a given period of time, which is particularly problematic given that controlled experiments are usually conducted to evaluate a new feature or update to a service and the quicker the experiment can be concluded, the quicker the new feature can be launched or reworked if necessary.

SUMMARY

It is an object of the present technology to ameliorate at least some of the inconveniences present in the prior art.

According to a first broad aspect of the present technology, there is provided a method of conducting a controlled experiment using prediction of future user behavior. The method comprises: collecting behavior data on a first set of users and a second set of users over a first period of time, wherein: the first set of users is exposed to a control variant of a service; the second set of users is exposed to a treatment variant of the service; and the behavior data relates to a performance parameter of the controlled experiment; based on at least one prediction model applied to the behavior data, calculating predicted values of the performance parameter for each user of the first set of users and each user of the second set of users over a second period of time; and determining if a statistically significant difference exists between the predicted values of the performance parameter for each user of the first set of users and the predicted values of the performance parameter for each user of the second set of users In some implementations of the method, the method further comprises: calculating an average value of the predicted values of the performance parameter for each user of the first set of users; calculating an average value of the predicted values of the performance parameter for each user of the second set of users; and determining if a statistically significant difference exists between the average value of the predicted values of the performance parameter for each user of the first set of users and the average value of the predicted values of the performance parameter for each user of the second set of users.

In some implementations of the method, the method further comprises: obtaining actual values of the performance parameter for each user of the first set of users and each user of the second set of users based on the behavior data collected during the first period of time; combining each actual value of the performance parameter for each user of the first set of users with the corresponding predicted value of the performance parameter for each user of the first set of users into a combined value of the performance parameter for each user of the first set of users; combining each actual value of the performance parameter for each user of the second set of users with the corresponding predicted value of the performance parameter for each user of the second set of users into a combined value of the performance parameter for each user of the second set of users; calculating an average value of the of the combined values of the performance parameter for each user of the first set of users; calculating an average value of the combined values of the performance parameter for each user of the second set of users; and determining if a statistically significant difference exists between the average value of the combined values of the performance parameter for each user of the first set of users and the average value of the combined values of the performance parameter for each user of the second set of users.

In some implementations of the method, the server is an online service.

In some implementations, the controlled experiment evaluates a change in execution of the online service.

In some implementations, the online service is a search engine.

In some implementations, the change in execution is at least one of: a change in a ranking algorithm of the search engine, a change in engine response time of the search engine and a change in a user interface of the search engine.

In some implementations, the behavior data comprises measures of user interactions with the search engine.

In some implementations, the performance parameter comprises a pre-selected type of user interaction with the search engine.

In some implementations, the pre-selected type of user interaction comprises at least one of: a number of sessions per user, a number of queries per user, a number of clicks per user, a presence time of a user, a number of clicks per query of a user and an absence time per session of a user.

In some implementations of the method, the first period of time corresponds to a duration of the controlled experiment.

In some implementations of the method, the first period of time corresponds to a period of time less than a duration of the controlled experiment.

In some implementations of the method, the controlled experiment is terminated before an end of the duration of the controlled experiment.

In some implementations of the method, the prediction model is one of a gradient boosting decision tree model and a linear regression model.

In some implementations of the method, at least one feature derived from the behavior data is received and processed by the prediction model to execute the calculation of the predicted values of the performance parameter.

In some implementations of the method, the at least one feature derived from the behavior data is one of: a total feature, a time series feature, a statistics feature, a periodicity feature and a derivative feature.

According to another broad aspect of the present technology, there is provided a server comprising a processor and computer-readable instructions for conducting a controlled experiment using prediction of future user behavior. The processor is configured to: collect behavior data on a first set of users and a second set of users over a first period of time, wherein: the first set of users is exposed to a control variant of a service; the second set of users is exposed to a treatment variant of the service; and the behavior data relates to a performance parameter of the controlled experiment; based on at least one prediction model applied to the behavior data, calculate predicted values of the performance parameter for each user of the first set of users and each user of the second set of users over a second period of time; and determine if a statistically significant difference exists between the predicted values of the performance parameter for each user of the first set of users and the predicted values of the performance parameter for each user of the second set of users.

In some implementations of the server, the server is further configured to: calculate an average value of the predicted values of the performance parameter for each user of the first set of users; calculate an average value of the predicted values of the performance parameter for each user of the second set of users; and determine if a statistically significant difference exists between the average value of the predicted values of the performance parameter for each user of the first set of users with the average value of the predicted values of the performance parameter for each user of the second set of users.

In some implementations of the server, the server is further configured to: obtain actual values of the performance parameter for each user of the first set of users and each user of the second set of users based on the behavior data collected during the first period of time; combine each actual value of the performance parameter for each user of the first set of users with the corresponding predicted value of the performance parameter for each user of the first set of users into a combined value of the performance parameter for each user of the first set of users; combine each actual value of the performance parameter for each user of the second set of users with the corresponding predicted value of the performance parameter for each user of the second set of users into a combined value of the performance parameter for each user of the second set of users; calculate an average value of the of the combined values of the performance parameter for each user of the first set of users; calculate an average value of the combined values of the performance parameter for each user of the second set of users; and determine if a statistically significant difference exists between the average value of the combined values of the performance parameter for each user of the first set of users and the average value of the combined values of the performance parameter for each user of the second set of users.

In some implementations of the server, the service is an online service.

In some implementations of the server, the controlled experiment evaluates a change in execution of the online service.

In some implementations of the server, the online service is a search engine.

In some implementations of the server, the change in execution is at least one of: a change in a ranking algorithm of the search engine, a change in engine response time of the search engine and a change in a user interface of the search engine.

In some implementations of the server, the behavior data comprises measures of user interactions with the search engine.

In some implementations of the server, the performance parameter comprises a pre-selected type of user interaction with the search engine.

In some implementations, the pre-selected type of user interaction comprises at least one of: a number of sessions per user, a number of queries per user, a number of clicks per user, a presence time of a user, a number of clicks per query of a user and an absence time per session of a user.

In some implementations of the server, the first period of time corresponds to a duration of the controlled experiment.

In some implementations of the server, the first period of time corresponds to a period of time less than a duration of the controlled experiment.

In some implementations of the server, the controlled experiment is terminated before an end of the duration of the controlled experiment.

In some implementations of the server, the prediction model is one of a gradient boosting decision tree model and a linear regression model.

In some implementations of the server, at least one feature derived from the behavior data is received and processed by the prediction model to execute the calculating of the predicted values of the performance parameter.

In some implementations of the server, the at least one feature derived from the behavior data is one of: a total feature, a time series feature, a statistics feature, a periodicity feature and a derivative feature.

In the context of the present specification, unless expressly provided otherwise, a "server" is a computer program that is running on appropriate hardware and is capable of receiving requests (e.g., from electronic devices) over a network, and carrying out those requests, or causing those requests to be carried out. The hardware may be one physical computer or one physical computer system, but neither is required to be the case with respect to the present technology. In the present context, the use of the expression "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server."

In the context of the present specification, unless expressly provided otherwise, an "electronic device" is any computer hardware that is capable of running software appropriate to the relevant task at hand. Thus, some non-limiting examples of electronic devices include personal computers (desktops, laptops, netbooks, etc.), smartphones, and tablet computers. It should be noted that a device acting as an electronic device in the present context is not precluded from acting as a server to other electronic devices. The use of the expression "electronic device" does not preclude multiple electronic devices being used in receiving/sending, carrying out or causing to be carried out any task or request, or the consequences of any task or request, or steps of any method described herein.

In the context of the present specification, unless expressly provided otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the expression "component" is meant to include software (appropriate to a particular hardware context) that is both necessary and sufficient to achieve the specific function(s) being referenced.

In the context of the present specification, unless expressly provided otherwise, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 2 illustrates assessed measures of user interaction having been processed by a server and saved at a storage;

FIG. 3 illustrates predicted measures of user interaction having been calculated at a server and saved at a storage;

DESCRIPTION

Figure 1:
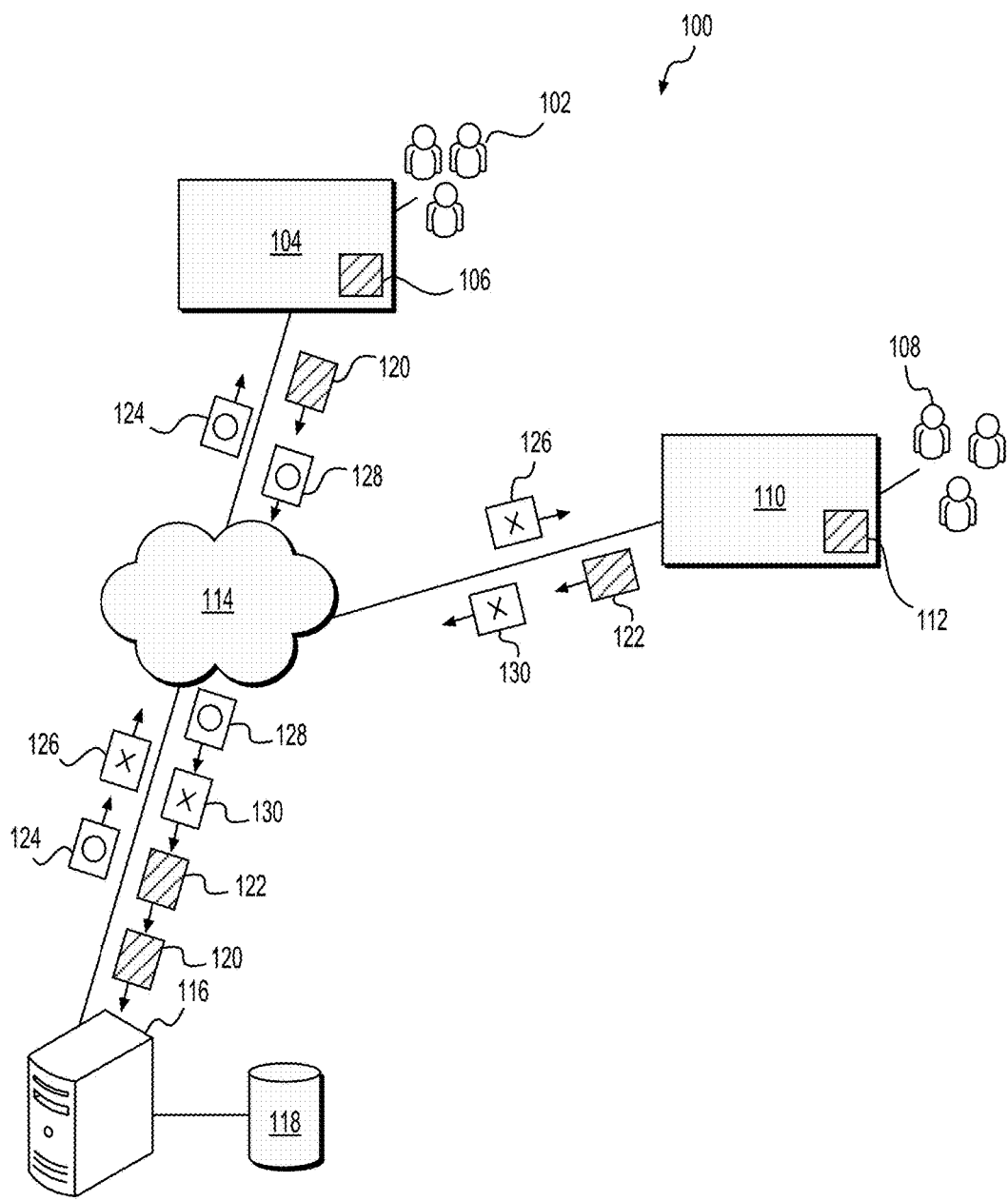
FIG. 1 is a schematic diagram of a system being an implementation of the present technology.

In FIG. 1, there is depicted a schematic diagram of a system 100 which is linked via a communication network 114. It is to be expressly understood that the system 100 is depicted as an illustrative implementation of the present technology. Thus, the following description should be considered only as the description of illustrative implementation of the present technology. This description is not intended to define the scope or set forth the bounds of the present technology. In some cases, what are believed to be helpful examples of modifications to the system 100 may also be described below. This is done merely as an aid to understanding, and, again, not to define the scope or set forth the bounds of the present technology. These modifications are not an exhaustive list, and, as a person skilled in the art would understand, other modifications are likely possible. Further, where no examples of modifications have been set forth, it should not be interpreted that no modifications are possible and/or that what is described is the sole manner of implementing that, element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

How a communication link (not depicted) is implemented is not particularly limited and will depend on which devices are connected to the communication network 114. As a non-limiting example, the connection of a server 116 to the communication network 114 can be implemented via a wired connection (such as an Ethernet based connection). At the same time, other devices could be also connected in other ways. In those examples, where a connected device (not depicted) is implemented as a wireless communication device (e.g. a smart-phone), the connection can be implemented as a wireless communication network (such as but not limited to, a 3G communications network link, a 4G communications network link, a Wireless Fidelity, or WiFi® for short, Bluetooth® and the like). In those examples, where a first electronic device 104 and a second electronic device 110 are implemented as desktop computers, the communication link can be either wireless or wired (such as an Ethernet based connection).

The system 100 may comprise the server 116. The server 116 may be implemented as a conventional computer server. In an example of an embodiment of the present technology, the server 116 may be implemented as a Dell™ PowerEdge™ Server running the Microsoft™ Windows Server™ operating system. Needless to say, the server 116 may be implemented in any other suitable hardware and/or software and/or firmware or a combination thereof. In the depicted non-limiting embodiment of present technology, the server 116 is a single server. In alternative non-limiting embodiments of the present technology, the functionality of the server 116 may be distributed and may be implemented via multiple servers. In some embodiments, the server 116 may comprise search engine software (not depicted) and may be further under control of a search engine provider such as Yandex™. In accordance with embodiments of the present technology and as will be described in greater detail herein below, the server 116 is configured to execute a controlled experiment evaluates a change in execution of a Search Engine Result Pages (SERP).

The server 116 includes a storage 118 that may be used by the server 116. Generally, the storage 118 may be implemented as a medium of any nature and kind whatsoever, including RAM, ROM, disks (CD-ROMs, DVDs, floppy disks, hard drivers, etc.), USB keys, solid state-drives, tape drives, etc. and also the combinations thereof.

The implementations of the server 116 are well known in the art. Thus, suffice it to state, that the server 116 comprises, inter alia, a network communication interface (such as a modem, a network card and the like) (not depicted) for two-way communication over the communication network 114; and a processor (not depicted) coupled to the network communication interface, the processor being configured to execute various routines, including those described herein below. To that end, the processor may store or have access to computer readable instructions stored in the storage 118, which instructions, when executed, cause the processor to execute the various routines described herein. The storage 118 of the server 116 is configured to store data including computer-readable instructions and databases.

In some implementations, the storage 118 is configured to store various data such as indexes of web pages that were crawled by a crawler application (not depicted) of the search engine software available on the server 116. In other embodiments, the storage 118 may store other data received by the server 116.

The system 100 comprises a first electronic device 104 and a second electronic device 110. The first electronic device 104 is associated with a first set of users 102 and the second electronic device 110 is associated with a second set of users 108. It should be noted that the fact that the first electronic device 104 is associated with the first set of users 102 and the second electronic device 110 is associated with the second set of users 108 does not need to suggest or imply any mode of operation—such as a need to log in, a need to be registered or the like. In further embodiments, the first electronic device 104 may be a first plurality of electronic devices and the second electronic device 110 may be a second plurality of electronic devices. Thus, the first and the second electronic devices 104 and 110 have been depicted as single electronic devices in FIG. 1 merely for the sake of simplicity.

In some embodiments, a size of the first set of users 102 and a size of the second set of users 108 may be identical. In other words, a number of users in the first set of users 102 may be identical to a number of users in the second set of users 108. In alternative embodiments, the size of the first set of users 102 and the size of the second set of user 108 may be comparable. In other words, the number of users in the first set of users 102 may be close to the number of users in the second set of users 108. For example, the number of users in the first set of users 102 and the number of users in the second set of users 108 may be hundreds of thousands. It should be noted that the number of users in the first set of users 102 and the second set of users 108 is not intended to be a limiting aspect of the present technology.

The first electronic device 104 and the second electronic device 110 each include an information storage (not depicted). Generally, the information storage may be implemented as a medium of any nature and kind whatsoever, including RAM, ROM, disks (CD-ROMs, DVDs, floppy disks, hard drivers, etc.), USB keys, solid state-drives, tape drives, etc. and also the combinations thereof. The information storage may store user files and program instructions. In particular, the information storage may store software for executing a browser application. In some embodiments, the first electronic device 104 may execute a browser 106 and the second electronic device 110 may execute a browser 112. Generally speaking, the purpose of the browser 106 and the browser 112 is to enable the first set of users 102 and the second set of users 108 to request web page data and displaying the data on the displays of the electronic devices 104 and 110. In some embodiments, the browser 106 and the browser 112 can be provided by the same vendor, while in other embodiments, the browser 106 and the browser 112 may be provided by different vendors.

The implementation of the first electronic device 104 and the second electronic device 110 is not particularly limited, but as an example, the first electronic device 104 and the second electronic device 110 may be implemented as personal computers (desktops, laptops, netbooks, etc.) or as wireless communication devices (a cell phone, a smartphone, a tablet and the like). In FIG. 1, the first electronic device 104 and the second electronic device 110 are implemented as laptops such as, for example, Apple™ MacBook Pro™ laptops. The first electronic device 104 may be executing the browser 106, the browser 106 being implemented as a Yandex™ browser application. The second electronic device 110 may be executing the browser 112, the browser 112 being implemented as another browser application. In some embodiments, the browser 106 and the browser 112 may be implemented as an identical browser application. It should be expressly understood that any other commercially available or proprietary browser application can be used for implementing non-limiting embodiments of the present technology. Moreover, it should be noted that the browser 106, the browser 112 and the search engine available at the server 116 may have a common provider or different providers.

Each user within the first set of users 102 may access a service on the web. In some implementations, the service may be a web site. In alternative implementations, the service may be a web-based application such as a map service or an e-mail service. In further embodiments, the service may be a search engine. Thus, in some embodiments, each user within the first set of users 102 may access a search engine by navigating, for example, to www.yandex.com, via the browser 106, for viewing a set of search results that are responsive to the user's search query.

As such, a data packet 120 may be generated by the browser 106 and may be sent to the server 116 via the communication network 114. The data packet 120 comprises a user search request for a Search Engine Results Page (SERP). In some embodiments of the present technology, the search engine software of the server 116 may determine the set of search results and may generate and send a data packet 124 to the first electronic device 104. The data packet 124 may comprise a first version of the SERP and instructions for the browser 106 to display the first version of the SERP on the display of the first electronic device 104. How the SERP is generated is not particularly limited and the SERP can be generated using any known techniques.

In some embodiments, the data packet 120 may comprise a first plurality of data packets, each data packet of the first plurality of data packets being sent from a respective electronic device of the first plurality of electronic devices. Similarly, the data packet 124 may comprise a second plurality of data packets, each data packet of the second plurality of data packets being sent to the respective electronic device of the first plurality of electronic devices.

Similarly, each user within the second set of users 108 may access the search engine provider's web site via the browser 112 for viewing the set of search results associated with her search query. In other words, a data packet 122 may be generated by the browser 112 and may be sent to the server 116 via the communication network 114. The data packet 122 comprises the user request for the SERP. In some embodiments of the present technology, the search engine software of the server 116 may determine the set of search results and may generate and send a data packet 126 to the second electronic device 110. The data packet 126 may comprise a second version of the SERP and instructions for the browser 112 to display the second version of the SERP on the display of the second electronic device 110.

In some embodiments, the data packet 122 may comprise a third plurality of data packets, each data packet of the third plurality of data packets being sent from a respective electronic device of the second plurality of electronic devices. Similarly, the data packet 126 may comprise a fourth plurality of data packets, each data packet of the fourth plurality of data packets being sent to the respective electronic device of the second plurality of electronic devices.

The second version of the SERP is generally different from the first version of the SERP. In some embodiments, the second version of the SERP may be a modified version of the SERP. In other embodiments, the second version of the SERP may be a first version of the SERP including a modification (i.e., a modified first version of the SERP). For example, the modification may be applied to a user interface of the SERP, a ranking algorithm used to generate the SERP, a change in engine response time to generate the SERP, a change in a user interface on the SERP and the like, or any combination thereof. In other embodiments, the second version of the SERP may have a modified design of the advertisements, a modified background color, modified snippets, a modified presentation of advertisements in a special location on the SERP or any combination thereof, as compared to the first version of the SERP. In yet another embodiment, the first version of the SERP may be a current production version of the SERP implemented by the search engine software and the second version of the SERP may be an update or a modification of the current production version of the SERP. Thus, in some embodiments, the controlled experiment evaluates a change in execution of the SERP. Moreover, it should be noted that modifications other than those mentioned above may be contemplated by the present technology. It is also noted that in the context of controlled experiments, the first version of the SERP may be referred to as the "control" variant of the service, whereas the second version of the SERP, featuring one or more modifications, can be referred to as the "treatment variant" of the service.

Further, upon the receipt of the data packet 124 and the data packet 126 by the first electronic device 104 and the second electronic device 110, respectively, the browser 106 may display the first version of the SERP contained within the data packet 124 to the first set of users 102 and the browser 112 may display the second version of the SERP contained within the data packet 126 to the second set of users 108. Upon the display of the first version of the SERP, the first set of users 102 may decide to perform user interactions with the first version of the SERP. Similarly, upon the display of the second version of the SERP, the second set of users 108 may decide to perform user interactions with the second version of the SERP.

Generally, each user within the first set of users 102 and the second set of users 108 may "interact" with the service in many ways. Thus, each user within the first set of users 102 and the second set of users 108 may "interact" with the SERP. In some instances, the many ways in which the first set of users 102 and the second set of users 108 interact with the SERP may be by selecting a particular search result or a link, by submitting a query reformulation or a distinct query, by spending an amount of time on the SERP or on the particular search result and the like. Therefore, in some embodiments of the present technology, a type of user interaction may be clicks on the SERP, user submitted queries on the SERP, presence time on the SERP, user SERP sessions, absence time per session and the like. User behavior data comprising the user interactions may be stored in a browser cache (not depicted) of the browser 106 and/or the browser 112. It should be noted that the several ways of interacting with the SERP were presented for explanation and illustration purposes only, and other types of user interaction with the SERP may be contemplated in some implementations of the present technology.

In another embodiment of the present technology, a data packet 128 may be sent by the first electronic device 104 to the server 116. The data packet 128 comprises information related to the user interactions of the first set of users 102 with the first version of the SERP. Similarly, a data packet 130 may be sent by the second electronic device 110 to the server 116. The data packet 130 comprises information related to the user interactions of the second set of users 108 with the second version of the SERP.

In some embodiments, the data packet 128 may comprise a fifth plurality of data packets, each data packet of the fifth plurality of data packets being sent from the respective electronic device of the first plurality of electronic devices. Similarly, the data packet 130 may comprise a sixth plurality of data packets, each data packet of the sixth plurality of data packets being sent from the respective electronic device of the second plurality of electronic devices.

In other embodiments, the server 116 may be configured to store the behavior data related to the user interactions of the first set of users 102 with the first version of the SERP and the information related to the user interactions of the second set of users 108 with the second version of the SERP in the storage 118.

The server 116 may filter the behaviour data related to the user interactions to obtain information related to a performance parameter of the controlled experiment. Generally, the performance parameter is a parameter selected to evaluate the difference in user behavior between control variant of a service (e.g., the first version of the SERP) and the treatment variant of the service (e.g., the second version of the SERP). In some embodiments, the performance parameter may be a pre-selected type of user interaction. For instance, if a modification is applied to the ranking algorithm of search results, the server 116 may filter the information related to the user interactions to obtain information related to the time spent on search results having been selected. Typically, the pre-selected type of user interaction is pre-selected based on how well the pre-selected type of user interaction may reflect a change in user behavior between the first and the second version of the SERP.

In one embodiment, the pre-selected type of user interaction may be pre-selected by a human assessor. In another embodiment, the pre-selected type of user interaction may be pre-selected by the server 116 based on the modification applied to the second version of the SERP. Furthermore, in some embodiments, the pre-selected type of user interaction may be comprised of more than one type of user interaction. For example, the pre-selected type of user interaction may comprise both the number of clicks per session and the number of sessions per day, or any other combination of types of user interactions. Thus, the pre-selected type of user interaction is referred to in the singular simply for ease of reference.

In yet further embodiments, the server 116 may be configured to send another instruction (not depicted) to the first electronic device 104 and to the second electronic device 110 for including in the data packets 128 and 130 the information related to the user interactions, being only of a pre-selected type of user interaction, respectively.

The server 116 may be configured to collect behavior data relating to the performance parameter of the controlled experiment of the first set of users and the second set of users over a first period of time. In some embodiments, the first period of time may correspond to a duration of the controlled experiment. In other embodiments, the first period of time may correspond to a period of time shorter than a duration of the controlled experiment. Thus, for example, the server 116 may be configured to collect behavior data by assessing measures of user interactions with the first version of the SERP and the second version of the SERP that occurred during the first period of time. As mentioned above, the measures of user interactions may be any kind of measures relating to the interaction between the first set of users 102 with the first version of the SERP and the second sets of users 108 with the second version of the SERP (e.g., an amount of time spent on a given search results, an amount of time spent between consecutive sessions on the SERP, a number of clicks on the SERP, a number of queries submitted, a number of query reformulations, etc.). In another embodiment, assessing the measures of user interactions may comprise grouping the information related to the user interactions. In some embodiments, the grouped information related to the user interactions may then be stored in the storage 118.

Further, the server 116 may be configured to calculate predicted values of the performance parameter for each user of the first and second sets of users 102 and 108. The server 116 may be configured to calculate the predicted values by applying at least one prediction model to the behavior data collected during the first period of time. In some embodiments, the server 116 may thus be configured to apply at least one prediction model to the measures of user interactions with the first and second versions of the SERP assessed during the first period of time to calculate predicted measures of user interactions with the first and second versions of the SERP over the second period of time. Moreover, in some embodiments, the at least one prediction model may be a gradient boosting decision model, and in other embodiments, a linear regression model.

In some embodiments, in order to execute the calculating of the predicted values of the performance parameter over the second period of time, the server 116 may be configured to calculate and send at least one feature derived from the collected behavior data to the at least one prediction model. Thus, in some embodiments, the server 116 may be configured to apply the at least one prediction model, having received the at least one feature, to the assessed measures of user interactions with the first and second versions of the SERP to calculate predicted measures of user interactions with the first and second versions of the SERP. A "feature" derived from the collected behavior data refers to calculating or transforming the collected behavior data to obtain calculated or transformed pieces of data that, when utilized by the at least one prediction model, allow for a more accurate prediction of future behavior over the second period of time. Each piece of data thus obtained from the collected behavior data may be referred to as a "feature," as will be further described below.

In some embodiments, the at least one feature may be a total feature. In order to obtain a total feature, the server 116 may be configured to calculate the total number of assessed measures of user interactions, being of the pre-selected type of user interaction, over the first period of time. For example, if the pre-selected type of user interaction is the number of sessions, the server 116 may calculate the total feature by adding each session assessed during the first period of time for each user of the first and second sets of users and obtaining a total amount of sessions assessed during the first period of time for each user of the first and second set of users.

In some embodiments, the at least one feature may be a time series feature. In order to obtain a time series feature, the server 116 may be configured to calculate the assessed measures of user interactions over each day of the first time period. The time series can be calculated as follows:

$$\{x\_t\}\_\{t=1\}^{\{|T\_p|\}}$$

where |T_p| is the length of the observed period; t is the time step (i.e., a day or the like); and x_t is the value of the performance parameter (i.e., measure of user interaction) at the t-th day (e.g., the number of sessions during the t-th day). Thus, in this example, $\{x\_t\}\_\{t=1\}^{\{|T\_p|\}}$ calculates the time series of the number of sessions per day. By performing this calculation, the server 116 obtains a time series having a length equal to the number of days in the first period of time. This calculation by the server 116 may produce |T_p| features.

In some embodiments, the at least one feature may be a statistics feature. In order to obtain a statistics features, the server 116 may be configured to obtain the minimal, maximal and average values of the time series calculated by the server 116 as described above. The server 116 may also be configured to calculate the standard deviation and the variation of the time series. The calculation by the server 116 of the minimal value, maximal value, average value, standard deviation and variation of the time series yields five statistics features.

In some embodiments, the at least one feature may a periodicity feature. In order to obtain a periodicity feature, the server 116 may be configured to apply the discrete Fourier transform (DFT) algorithm to the time series, which is defined as a sum over observed days of the performance parameter value x_t at the t-th day, and which is calculated as follows:

$$X\_k = \text{sum}\_\{t=1\}^{\{|T\_p|\}} x\_t \exp(-i \backslash \text{omega}\_k(t-1))$$

where the exponent exp(−i \omega_k (t−1)) is a square root of −1 (i.e., the imaginary unit), \omega_k=2*\pi*k/|T_p| is some constant for each k. This transformation of the time series allows to obtain complex amplitudes, real amplitudes and phases and may produce 2|T_p| features. The periodicity features thus obtained by the server 116 show the periodicity in the time series.

In some embodiments, the at least one feature may be a derivative feature. In order to obtain a derivative feature, the server 116 may be configured to calculate the finite difference series of the first and second orders of the time series, which are analogs of the first and second derivatives in the discrete case. Namely, the server 116 may be configured to obtain the first order finite difference series, calculated as follows:

$$x':=\{X\_t+1-X\_t\}t=1^\wedge|T\_p|-1$$

and the second order finite difference series, calculated as follows:

$$x'':=\{xt+2-2xt+1+xt\}t=1^\wedge|T\_p|-2.$$

These transformations of the time series by the server 116 may produce 2|T_p| features.

It should be noted that the above description of the total, time series, statistics, periodicity and derivative features described features is not meant to provide an exhaustive list of features that may be derived from the behavior data collected during the first period of time. The above-described features merely illustrate some of the features that can be derived from the collected behavior data and used in predicting the future behavior, and are not intended to be a limiting aspect of the present technology. Furthermore, in some embodiments, the server 116 may be configured to calculate and send more than one feature derived from the collected behavior data to the at least one prediction model in order to calculated the predicted values of the performance parameter over the second period of time. Thus, any combination of the total, time series, statistics, periodicity and derivative features and any other features derived from the collected behavior data may be obtained and sent by the server 116 to the at least one prediction model.

For instance, the quantity of features to be sent to the at least one prediction model can be determined as follows. The server 116 can denote the set of calculation and transformation methods described above as All={Total, TS, SF, PF, DF}, where Total denotes the method of calculating a total feature, TS denotes a method of calculating a time series feature, SF denotes a method of calculating a statistics feature, PF denotes the method of calculating a periodicity feature and DF denotes the method of calculating a derivative feature. These methods constitute different ways to translate each user interaction measure M∈M into 5|T_p|+3 scalar features. Therefore, the feature set utilized in a particular prediction task is determined by two components: the first one is a set of utilized user interaction measures M'⊆M and the second one is a set of calculation/transformation methods T⊆All. Thus, the total number of utilized scalar features will be equal to: |M'|·|T|. For example, if in a prediction task, the server 116 utilizes only the number of sessions S and the presence time PT (i.e., M'={S, PT}, |M'|=2) and the server 116 translates them into features by means of all calculation and transformation methods over a week (i.e., |T_p|=7 days), then the total number of scalar features will be 2·(5·7+3)=76.

Further, the server 116 may be configured to determine if a statistically significant difference exists between the predicted values of the performance parameter for each user of the first set of users and the predicted values of the performance parameter for each user of the second set of users. Thus, for example, the server 116 may be configured to determine if a statistically significant difference exists between the measures of user interaction with the first and second versions of the SERP, predicted over the second period of time. A statistically significant difference generally refers to a result that is caused by a variable other than mere random chance.

In some embodiments, the server 116 may be further configured to calculate an average value of the predicted values of the performance parameter for each user of the first set of users; calculate an average value of the predicted values of the performance parameter for each user of the second set of users; and determine if a statistically significant difference exists between the average value of the predicted values of the performance parameter for each user of the first set of users and the average value of the predicted values of the performance parameter for each user of the second set of users. Thus, for example, the server 116 may be configured to calculate average values of the predicted measures of user interactions of all users of the first set of users 102 and the second set of users 108, respectively, and to determine if a statistically significant difference exists between these average values calculated for each set of users. As such, this calculation by the server 116 allows to determine whether, and to what degree, the modification to the treatment variant of the service (e.g., the second version of the SERP) would have an effect on user behavior with regards to the performance parameter over the second period of time.

In some embodiments, the server 116 may be further configured to obtain actual values of the performance parameter for each user of the first set of users and each user of the second set of users based on the behavior data; combine each actual value of the performance parameter for each user of the first set of users with the corresponding predicted value of the performance parameter for each user of the first set of users into a combined value of the performance parameter for each user of the first set of users; combine each actual value of the performance parameter for each user of the second set of users with the corresponding predicted value of the performance parameter for each user of the second set of users into a combined value of the performance parameter for each user of the second set of users; calculate an average value of the of the combined values of the performance parameter for each user of the first set of users; calculate an average value of the combined values of the performance parameter for each user of the second set of users; and determine if a statistically significant difference exists between the average value of the combined values of the performance parameter for each user of the first set of users and the average value of the combined values of the performance parameter for each user of the second set of users.

Thus, for example, the server 116 may be configured to retrieve the measures of user interactions with the first and second versions of the SERP assessed during the first period of time and combine them with the corresponding measures of user interactions predicted over the second period of time for each user of the first and second sets of users 102 and 108. The server 116 may then be configured to calculate averages of these combined measures of user interactions for the first set of users 102 and the second set of users 108, respectively, and determine if a statistically significant difference exists between these average values calculated for each set of users. As such, this calculation by the server 116 allows to determine whether, and to what degree, the modification to the treatment variant of the service (e.g., the second version of the SERP) had an effect on user behavior with regards to the performance parameter (e.g., the preselected type of user interaction) over a combined period of time comprised of the first period of time and the second period of time. The server 116 is thus able to evaluate the performance parameter of the controlled experiment as if the experiment had been conducted over the entire combined period of time comprising the first and second periods of time, rather than merely over the first period of time.

FIG. 2 depicts a table 200 encompassing behavior data with a web service, namely measures of user interactions with a first version of a SERP after the measures of user interactions have been assessed by the server 116 during the first period of time. The measures of user interactions with the first version of the SERP relate to user interactions of the pre-selected type of user interaction (i.e., the performance parameter) performed by each user within the first set of users 102 (i.e., users A, B and C as depicted in FIG. 2). A column 204 comprises the measures of user interactions (in this case the pre-selected type of user interaction is the number of sessions) corresponding to each user within the first set of users 102. For instance, the server 116 assessed the measure of 2 sessions for the user A.

FIG. 2 also depicts a table 202, which encompasses measures of user interactions with a second version of the SERP after the measures of user interactions have been assessed by the server 116 during the first period of time. The measures of user interactions with the second version of the SERP relate to the user interactions of the pre-selected type of user interaction performed by each user within the second set of users 108 (i.e., user D, E and F as depicted in FIG. 2). A column 204 comprises the measures of user interactions corresponding to each user within the second set of users 108. For instance, the server 116 assessed the measure of 4 sessions for the user D.

It should be noted that the number of users of the first and the second sets of users 102 and 108 shown in the tables 200 and 202 in FIG. 2 is intended to be illustrative and for ease of explanation only, and should not be considered a limiting aspect of the present technology. Moreover, the columns 204 and 206 may comprise multiple measures respectively corresponding to each user within the first and the second sets of users 102 and 108. For example, if the pre-selected type of user interaction is click dwell-time, the columns 204 and 206 may comprise multiple measures of the click dwell-time for each user depending on how many clicks each user performed.

In some embodiments, the server 116 may be configured to store the table 200, encompassing the measures of user interactions with the first version of the SERP and the table 202 encompassing the measures of user interactions with the second version of the SERP after these measures of user interactions have been assessed by the server 116. For example, the server 116 may store the table 200 and the table 202 in the storage 118. Furthermore, even though the table 200 and the table 202 have been depicted as separate tables, the server 116 can store the measures of user interaction with the first version of the SERP and the second version of the SERP in a single table (not depicted).

FIG. 3 depicts a table 300 encompassing predicted values of the performance parameter assessed by the server 116 in FIG. 2, namely measures of user interactions with the first version of the SERP during the second period of time after these measures have been calculated by the server 116 by applying at least one prediction model to the measures of user interactions with the first version of the SERP assessed during the first period of time (encompassed in the table 200 of FIG. 2). A column 304 comprises the predicted measures of user interactions (i.e., the number of sessions) corresponding to each user within the first set of users 102. For instance, the server 116 calculated the predicted measure of 1 session for the user A.

FIG. 3 also depicts a table 302, which encompasses the predicted measures of user interactions with the second version of the SERP during the second period of time after these measures have been calculated by the server 116 by applying at least one prediction model to the measures of user interactions with the second version of the SERP assessed during the first period of time (encompassed in the table 202 of FIG. 2). A column 204 comprises the measures of user interactions corresponding to each user within the second set of users 108. For instance, the server 116 calculated the predicted measure of 3 sessions for the user D.

In some embodiments, the server 116 may be configured to store the table 300, encompassing the predicted measures of user interactions with the first version of the SERP and the table 302 encompassing the predicted measures of user interactions with the second version of the SERP after these predicted measures of user interactions have been calculated by the server 116. For example, the server 116 may store the table 300 and the table 302 in the storage 118. Furthermore, even though the table 300 and the table 202 have been depicted as separate tables, the server 116 can store the predicted measures of user interaction with the first version of the SERP and the second version of the SERP in a single table (not depicted).

Figure 4:
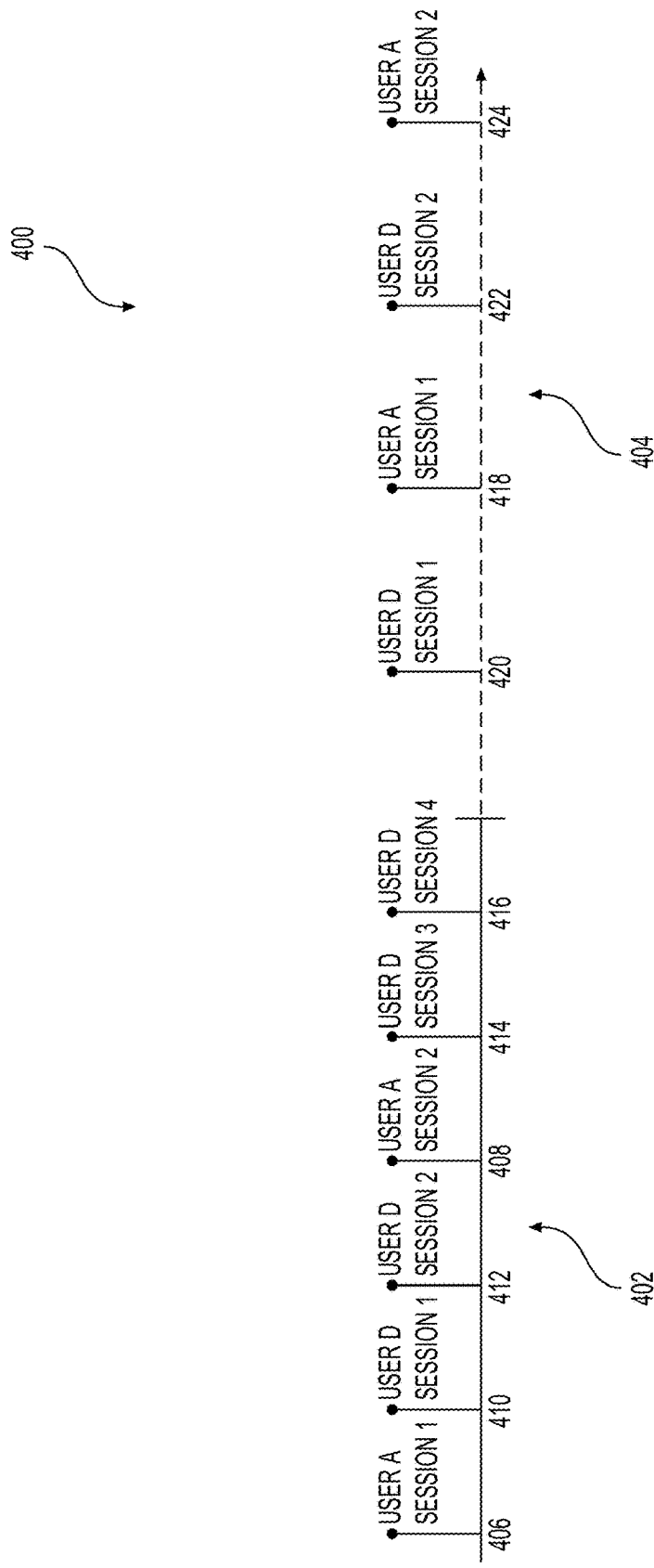
FIG. 4 illustrates a timeline showing measures of user interaction having occurred during a first period of time and predicted measures of user interaction having occurred during a second period of time.

FIG. 4 depicts a timeline 400 comprising a first period of time 402 (represented by the solid line portion of the timeline 400) and a second period of time 404 (represented by the dotted line portion of the timeline 400). The timeline 400 shows the occurrence of user sessions that were assessed by the server 116 as measures of user interactions of the first set of users 102 (user A as depicted in the FIG. 400) and the second set of users 108 (user D as depicted in the FIG. 400) during the first period of time 402.

Specifically, user sessions 406 and 408 represent the 2 sessions of the user A with the first version of the SERP during the first period of time, assessed by the server 116, as shown in table 200 of FIG. 2. User sessions 410, 412, 414 and 416 represent the 4 sessions of the user D with the second version of the SERP during the first period of time, assessed by the server 116, as shown in table 202 of FIG. 2. Thus, as can be seen, the assessed sessions of the first set of users 102 and the second set of users 108 are measures of user interactions that occurred at some point during the first period of time. It is noted that the number of users of the first and second sets of users 102 and 108 shown on the timeline in FIG. 4 is intended to be illustrative and for ease of explanation only, and should not be considered a limiting aspect of the present technology, FIG. 4 also shows the occurrence of predicted user sessions of the first set of users 102 and the second set of users 108 over the second period of time 404, which were calculated by the server 116 by applying the at least one prediction model to the measures of user interactions having occurred during the first period of time 402 and having been assessed by the server 116. Specifically, user session 418 represents the 1 predicted session of user A with the first version of the SERP during the second period of time 404, calculated by the server 116, as shown in table 302 of FIG. 3. User sessions 420, 422 and 424 represent the 3 predicted sessions of user D with the second version of the SERP during the second period of time 404, calculated by the server 116, as shown in the table 306 of FIG. 3. Thus, as can be seen, the predicted sessions of the first set of users 102 and the second set of users 108 are measures of user interaction that are predicted to occur at some point during the second period of time. In the illustrated, the second period of time 404 is contiguous with the first period of time 402. However, in other embodiments, the second period of time may be non-contiguous with the first period of time.

Figure 5:
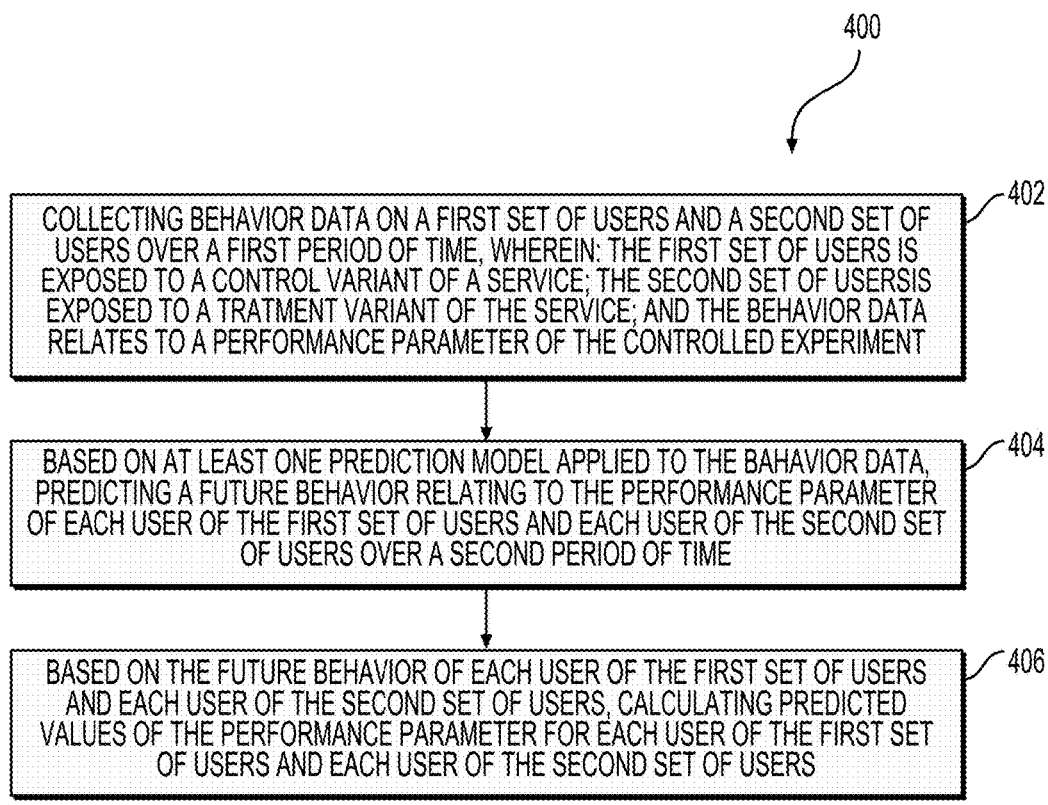
FIG. 5 illustrates a block diagram of a method of conducting an online controlled experiment using prediction of future user behavior.

In other embodiments of the present technology, the server 116 may be configured to execute a method 500 of conducting a controlled experiment, as depicted in FIG. 5. The method 500 is described next.

STEP 502: Collecting behavior data on a first set of users and a second set of users over a first period of time, wherein: the first set of users is exposed to a control variant of a service; the second set of users is exposed to a treatment variant of the service; and the behavior data relates to a performance parameter of the controlled experiment.

The method 500 begins at step 502 with the server 116 collecting behavior data on the first set of users 102 and the second set of users 108 over a first period of time, wherein: the first set of users 102 is exposed to a control variant of a service; the second set of users 108 is exposed to a treatment variant of the service; and the behavior data relates to a performance parameter of the controlled experiment.

At step 502, the first set of users may request to access a service on the web using the browser 106 of the first electronic device 104. In response to the user request, the server 116 may generate a control variant of the service. For example, in some embodiments, the service may be a search engine and the control variant of the service may be a first version of a search engine results page (SERP). Thus, the server 116 may generate the first version of the SERP and send it to the first electronic device 104. The first set of users 102 may then be presented with the first version of the SERP on the display of first electronic device 104.

The second set of users 108 may also request the service on the web using the browser 112 of the second electronic device 110. In response to the user request, the server 116 may generate a treatment variant of the service. For example, in some embodiments, the treatment variant may be a second version of the SERP. Thus, the server 116 may generate the second version of the SERP and send it to the second electronic device 110. The second set of users 108 may then be presented with the second version of the SERP on the display of the second electronic device 110.

The treatment variant of the service generally differs from the control variant of the service in at least one respect. For example, in some embodiments, the second version of the SERP may differ from the first version of the SERP. In some embodiments, the second version of the SERP may be a modified version of the SERP. In other embodiments, the second version of the SERP may be a first version of the SERP including a modification (i.e., a modified first version of the SERP). For instance, the modification may be applied to a user interface of the SERP, a ranking algorithm used to generate the SERP, a change in engine response time to generate the SERP, a change in a user interface on the SERP and the like, or any combination thereof. In other embodiments, other types of modifications may be possible depending on the type of the service and other factors.

Generally, each user within the first set of users 102 and the second set of users 108 may "interact" with the service on the electronic devices 104 and 110 in many ways. Thus, in some embodiments, the behavior data collected by the server 116 may be measures of user interactions with the service. For example, the behavior data may be measures of user interactions with the first and second versions of the SERP. For instance, in some embodiments of the present technology, a type of user interaction may be clicks on the SERP, transitions to other web pages from the SERP, submitted queries, time spent on the SERP or on the other web pages, user SERP sessions and the like.

Further, the behavior data collected by the server 116 may relate to a performance parameter of the controlled experiment. The performance parameter refers to the evaluation criterion selected to assess whether, and to what extent, the difference between the treatment variant of the service and the control variant of the service has an effect on user behavior. In some embodiments, the performance parameter may be a pre-selected type of user interaction with a SERP. Thus, in some embodiments, the server 116 may assess measures of user interactions during the first period of time. For instance, the pre-selected type of user interaction number may be user sessions with a SERP. Therefore, the collection of behavior data relating to the performance parameter would include assessing by the server 116 each user session with the SERP.

The behavior data collected at step 502 by the server 116 is collected over a first period of time. In some embodiments, the first period of time may correspond to the duration of the controlled experiment. In alternative embodiments, the first period of time pay correspond to a period of time less than a duration of the controlled experiment. In some embodiments, for example, the server 116 may collect behavior data during the first period of time by assessing measures of user interactions, being of the pre-selected type of user interaction, having been performed by the first set of users 102 and the second set of users 108 during the first period of time.

STEP 504: Based on at least one prediction model applied to the behavior data, calculating predicted values of the performance parameter for each user of the first set of users and each user of the second set of users over a second period of time.

The method 500 continues to step 504 by the server 116, based on at least one prediction model applied to the behavior data, calculating predicted values of the performance parameter for each user of the first set of users 102 and each user of the second set of users 108 over a second period of time. In some embodiments, the at least one prediction model may be one of a gradient boosting decision tree model and a linear regression model.

At step 504, the server 116 applies a prediction model to the behavior data collected during the first period of time to calculate predicted values the performance parameter of the first and second sets of users 102 and 108 over a second period of time. In some embodiments, for example, the server 116 may apply a prediction model to the measures of user interactions of the first and second sets of users 102 and 108, assessed by the server 116 during the first period of time, to calculate predicted measures of user interactions of the first and second sets of users 102 and 108 over the second period of time.

In alternative embodiments, the server 116 may send at least one feature derived from the behavior data collected during the first period of time to the at least one prediction model and execute the prediction of the future behavior over the second period of time by applying the at least one prediction model with the at least one feature to the collected behavior data. The at least one feature may be derived from the behavior data by the server 116 applying a calculation or transformation to the behavior data. In some embodiments, the at least one feature may be one of a total feature, a time series feature, a statistics feature, a periodicity feature and a derivative feature. For example, the server 116 may calculate a total feature by calculating the total quantity of user sessions during the first period of time. In some embodiments, more than one feature may be sent to the prediction model by the at least one server 116 to execute the prediction task.

STEP 506: Determining if a statistically significant difference exists between the predicted values of the performance parameter for each user of the first set of users and the predicted values of the performance parameter for each user of the second set of users.

The method 500 continues to step 508 by the server 116 determining if a statistically significant difference exists between the predicted values of the performance parameter for each user of the first set of users 102 with the predicted values of the performance parameter for each user of the second set of users 108.

At step 508, the server 116 performs a comparison of the predicted values of the performance parameter of the first set of users 102 and the predicted values of the performance parameter of the second set of users 108. In alternative embodiments, the server 116 may also be configured to calculate an average value of the predicted values of the performance parameter for the first set of users 102 and calculate an average value of the predicted values of the performance parameter for each user of the second set of users 108. The server 116 may then perform a comparison to determine if a statistically significant difference exists between these average values calculated for each set of users. Thus, in some embodiments, this comparison allows to determine whether, and to what degree, the modification to the treatment variant of the service (e.g., the second version of the SERP) would have an effect on user behavior with regards to the performance parameter (e.g., the pre-selected type of user interaction) over the second period of time in the future.

In yet other embodiments, the server 116 may be further configured to obtain actual values of the performance parameter for each user of the first and second sets of users 102 and 108. The server 116 may then be configured to combine each actual value of the performance parameter for each user of the first and second sets of users 102 and 108 with the corresponding predicted value of the performance parameter for each user of the first and second sets of users 102 and 108 into a combined value of the performance parameter for each user of the first and second sets of users 102 and 108. The server 116 may then be configured to calculate an average value of the combined values for the first set of users 102 and an average value of the combined values for the second set of users 108. Further, the server 116 may be configured determine if a statistically significant difference exists between these average values calculated for each set of users.

For instance, in some embodiments, the server 116 may be configured to retrieve the measures of user interactions, being of the pre-selected type of interaction, assessed by the server 116 during the first period of time and organized in tables, as depicted in FIG. 2, stored in the storage 118. The server 116 may then be configured to retrieve the predicted measures of user interactions, being of the pre-selected type of user interactions, calculated by the server 116 and organized in tables, as depicted in FIG. 3, stored in the storage 118. The server 116 may then be configured to combine the assessed measures with the predicted measures for each user of the first and second sets of users 102 and 108 and to calculate average values of these combined measures for the first and second sets of users 102 and 108, respectively. The server 116 may then compare these average values calculated for each set of users to determine if a statistically significant difference exists between them. Thus, in some embodiments, this comparison allows to determine whether, and to what degree, the modification to the treatment variant of the service (e.g., the second version of the SERP) would have an effect on user behavior with regards to the performance parameter (e.g., the pre-selected type of user inter-action) over the combined period of time comprising both the first and second periods of time.

Some embodiments of the present technology allow the server 116 to perform controlled experiment(s) that take less time than conventional approaches, thus allowing to save on computing resources at the server. Some embodiments of the present technology further allow the server 116 to performed controlled experiment(s) of a shorter duration (without sacrificing accuracy thereof) and therefore be able to faster fine tune changes made to the services (such as changes to the SERP and the like), thus allowing to adjust the changes and thus to improve user satisfaction with the service in question.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

One skilled in the art will appreciate when the instant description refers to "receiving data" from a user that the electronic device executing receiving of the data from the user may receive an electronic (or other) signal from the user. One skilled in the art will further appreciate that displaying data to the user via a graphical user interface (such as the screen of the electronic device and the like) may involve transmitting a signal to the user-graphical interface, the signal containing data, which data can be manipulated and at least a portion of the data can be displayed to the user using the graphical user interface.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

In view of the foregoing, embodiments of the present technology described above can be summarized as follows, structured in numbered clauses.

CLAUSE 1. A method of conducting a controlled experiment using prediction of future user behavior, the method executable on at least one server, the method comprising:

collecting (502) behavior data on a first set of users (102) and a second set of users (108) over a first period of time, wherein:

the first set of users (102) is exposed to a control variant of a service;

the second set of users (108) is exposed to a treatment variant of the service; and the behavior data relates to a performance parameter of the controlled experiment;

based on at least one prediction model applied to the behavior data, calculating (504) predicted values of the performance parameter for each user of the first set of users (102) and each user of the second set of users (108) over a second period of time; and determining (506) if a statistically significant difference exists between the predicted values of the performance parameter for each user of the first set of users (102) and the predicted values of the performance parameter for each user of the second set of users (108).

CLAUSE 2. The method of clause 1, further comprising:
calculating an average value of the predicted values of the performance parameter for each user of the first set of users (102);
calculating an average value of the predicted values of the performance parameter for each user of the second set of users (108); and
determining if a statistically significant difference exists between the average value of the predicted values of the performance parameter for each user of the first set of users (102) and the average value of the predicted values of the performance parameter for each user of the second set of users (108).

CLAUSE 3. The method of clause 1, further comprising:
obtaining actual values of the performance parameter for each user of the first set of users (102) and each user of the second set of users (108) based on the behavior data collected during the first period of time;
combining each actual value of the performance parameter for each user of the first set of users (102) with the corresponding predicted value of the performance parameter for each user of the first set of users (102) into a combined value of the performance parameter for each user of the first set of users (102);
combining each actual value of the performance parameter for each user of the second set of users (108) with the corresponding predicted value of the performance parameter for each user of the second set of users (108) into a combined value of the performance parameter for each user of the second set of users (108);
calculating an average value of the of the combined values of the performance parameter for each user of the first set of users (102);
calculating an average value of the combined values of the performance parameter for each user of the second set of users (108); and
determining if a statistically significant difference exists between the average value of the combined values of the performance parameter for each user of the first set of users (102) and the average value of the combined values of the performance parameter for each user of the second set of users (108).

CLAUSE 4. The method of clause 1, wherein the service is an online service.

CLAUSE 5. The method of clause 4, wherein the controlled experiment evaluates a change in execution of the online service.

CLAUSE 6. The method of clause 5, wherein the online service is a search engine.

CLAUSE 7. The method of clause 6, wherein the change in execution is at least one of: a change in a ranking algorithm of the search engine, a change in engine response time of the search engine and a change in a user interface of the search engine.

CLAUSE 8. The method of clause 6, wherein the behavior data comprises measures of user interactions with the search engine.

CLAUSE 9. The method of clause 8, wherein the performance parameter comprises a pre-selected type of user interaction with the search engine.

CLAUSE 10. The method of clause 9, wherein the pre-selected type of user interaction comprises at least one of: a number of sessions per user, a number of queries per user, a number of clicks per user, a presence time of a user, a number of clicks per query of a user and an absence time per session of a user.

CLAUSE 11. The method of clause 1, wherein the first period of time corresponds to a duration of the controlled experiment.

CLAUSE 12. The method of clause 1, wherein the first period of time corresponds to a period of time less than a duration of the controlled experiment.

CLAUSE 13. The method of clause 12, wherein the controlled experiment is terminated before an end of the duration of the controlled experiment CLAUSE 14. The method of clause 1, wherein the prediction model is one of a gradient boosting decision tree model and a linear regression model.

CLAUSE 15. The method of clause 1, wherein at least one feature derived from the behavior data is received and processed by the prediction model to execute the calculating (504) of the predicted values of the performance parameter.

CLAUSE 16. The method of clause 15, wherein the at least one feature derived from the behavior data is one of: a total feature, a time series feature, a statistics feature, a periodicity feature and a derivative feature.

CLAUSE 17. A server (116) comprising a processor and computer-readable instructions for conducting a controlled experiment using prediction of future user behavior, the processor being configured to execute the methods of clauses 1 to 15.

What is claimed is:
1. A method of conducting a controlled experiment using prediction of future user behavior, the method executable on at least one hardware server, the method comprising:
collecting behavior data on a first set of users and a second set of users over a first period of time, wherein:
the first set of users is exposed to a control variant of a service;
the second set of users is exposed to a treatment variant of the service; and
the behavior data relates to a performance parameter of the controlled experiment;
based on at least one prediction model applied to the behavior data, calculating predicted values of the performance parameter for each user of the first set of users and each user of the second set of users over a second period of time;
obtaining actual values of the performance parameter for each user of the first set of users and each user of the second set of users based on the behavior data collected during the first period of time;
combining each actual value of the performance parameter for each user of the first set of users with the corresponding predicted value of the performance parameter for each user of the first set of users into a combined value of the performance parameter for each user of the first set of users;
combining each actual value of the performance parameter for each user of the second set of users with the corresponding predicted value of the performance parameter for each user of the second set of users into a combined value of the performance parameter for each user of the second set of users;
calculating an average value of the combined values of the performance parameter for each user of the first set of users;
calculating an average value of the combined values of the performance parameter for each user of the second set of users; and determining if a statistically significant difference exists between the average value of the combined values of the performance parameter for each user of the first set of users and the average value of the combined values of the performance parameter for each user of the second set of users;

selecting, based on the statistically significant difference, one of the control variant of the service and the treatment variant of the service.

2. The method of claim 1, wherein the service is an online service.

3. The method of claim 2, wherein the controlled experiment evaluates a change in execution of the online service.

4. The method of claim 3, wherein the online service is a search engine.

5. The method of claim 4, wherein the change in execution is at least one of: a change in a ranking algorithm of the search engine, a change in engine response time of the search engine and a change in a user interface of the search engine.

6. The method of claim 4, wherein the behavior data comprises measures of user interactions with the search engine.

7. The method of claim 6, wherein the performance parameter comprises a pre-selected type of user interaction with the search engine.

8. The method of claim 7, wherein the pre-selected type of user interaction comprises at least one of: a number of sessions per user, a number of queries per user, a number of clicks per user, a presence time of a user, a number of clicks per query of a user and an absence time per session of a user.

9. The method of claim 1, wherein the first period of time corresponds to a duration of the controlled experiment.

10. The method of claim 1, wherein the first period of time corresponds to a period of time less than a duration of the controlled experiment.

11. The method of claim 10, wherein the controlled experiment is terminated before an end of the duration of the controlled experiment.

12. The method of claim 1, wherein the prediction model is one of a gradient boosting decision tree model and a linear regression model.

13. The method of claim 1, wherein at least one feature derived from the behavior data is received and processed by the prediction model to execute the calculating of the predicted values of the performance parameter.

14. The method of claim 13, wherein the at least one feature derived from the behavior data is one of: a total feature, a time series feature, a statistics feature, a periodicity feature and a derivative feature.

15. A hardware server comprising a hardware processor and computer-readable instructions for conducting a controlled experiment using prediction of future user behavior, the hardware processor being configured to:

collect behavior data on a first set of users and a second set of users over a first period of time, wherein:
the first set of users is exposed to a control variant of a service;
the second set of users is exposed to a treatment variant of the service; and
the behavior data relates to a performance parameter of the controlled experiment;

based on at least one prediction model applied to the behavior data, calculate predicted values of the performance parameter for each user of the first set of users and each user of the second set of users over the second period of time;

obtain actual values of the performance parameter for each user of the first set of users and each user of the second set of users based on the behavior data collected during the first period of time;

combine each actual value of the performance parameter for each user of the first set of users with the corresponding predicted value of the performance parameter for each user of the first set of users into a combined value of the performance parameter for each user of the first set of users;

combine each actual value of the performance parameter for each user of the second set of users with the corresponding predicted value of the performance parameter for each user of the second set of users into a combined value of the performance parameter for each user of the second set of users;

calculate an average value of the combined values of the performance parameter for each user of the first set of users;

calculate an average value of the combined values of the performance parameter for each user of the second set of users; and determine if a statistically significant difference exists between the average value of the combined values of the performance parameter for each user of the first set of users and the average value of the combined values of the performance parameter for each user of the second set of users;

select, based on the statistically significant difference, one of the control variant of the service and the treatment variant of the service.

16. The server of claim 15, wherein at least one feature derived from the behavior data is received and processed by the prediction model to execute the calculating of the predicted values of the performance parameter.

* * * * *